United States Patent

[11] 3,589,512

| [72] | Inventor | Gunteher Schaaf<br>Fridley, Minn. |
|---|---|---|
| [21] | Appl. No. | 815,960 |
| [22] | Filed | Apr. 14, 1969 |
| [45] | Patented | June 29, 1971 |
| [73] | Assignee | Ramsey Engineering Company<br>St. Paul, Minn. |

[54] ARTICLE TESTING DEVICE
11 Claims, 6 Drawing Figs.

[52] U.S. Cl. .................................................... 209/73,
209/74, 209/81
[51] Int. Cl. ......................................................... B07c 3/12
[50] Field of Search ............................................ 209/73, 81.
74; 221/289, 290, 292, 293, 294; 324/158 P, 34
MC

[56] References Cited
UNITED STATES PATENTS

| 2,357,512 | 9/1944 | Gaiser ............................ | 209/81 |
| 2,975,894 | 3/1961 | Hill et al. ....................... | 324/34 (MCT) |
| 3,275,191 | 9/1966 | MacDonald .................. | 221/290 X |
| 3,292,782 | 12/1966 | Vosika .......................... | 324/34 (MCT) |

OTHER REFERENCES
IBM TECHNICAL DISCLOSURE BULLETIN, R.E. Danneberg et al.; Vol. 8 No. 12, May 1966

*Primary Examiner*—Allen N. Knowles
*Attorney*—Dugger, Peterson, Johnson & Westman ABSTRACT: A testing device for magnetic cores for memory systems having a testing station which permits insertion of the testing probe through the opening of a magnetic core or similar object without having the weight of the core resting on the test probe, and which handles the loading, testing and sorting of the cores through electrically actuated solenoids.

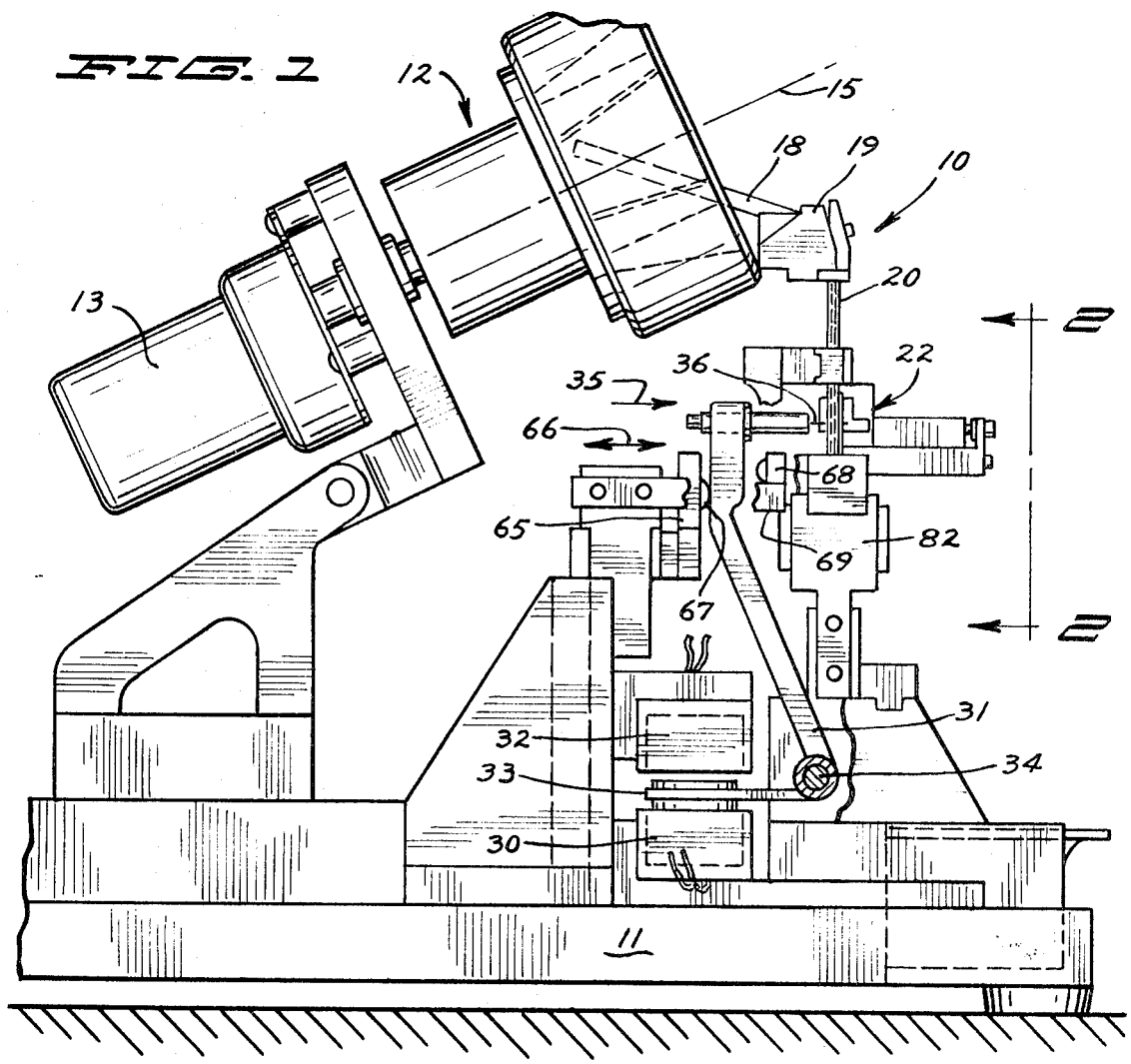
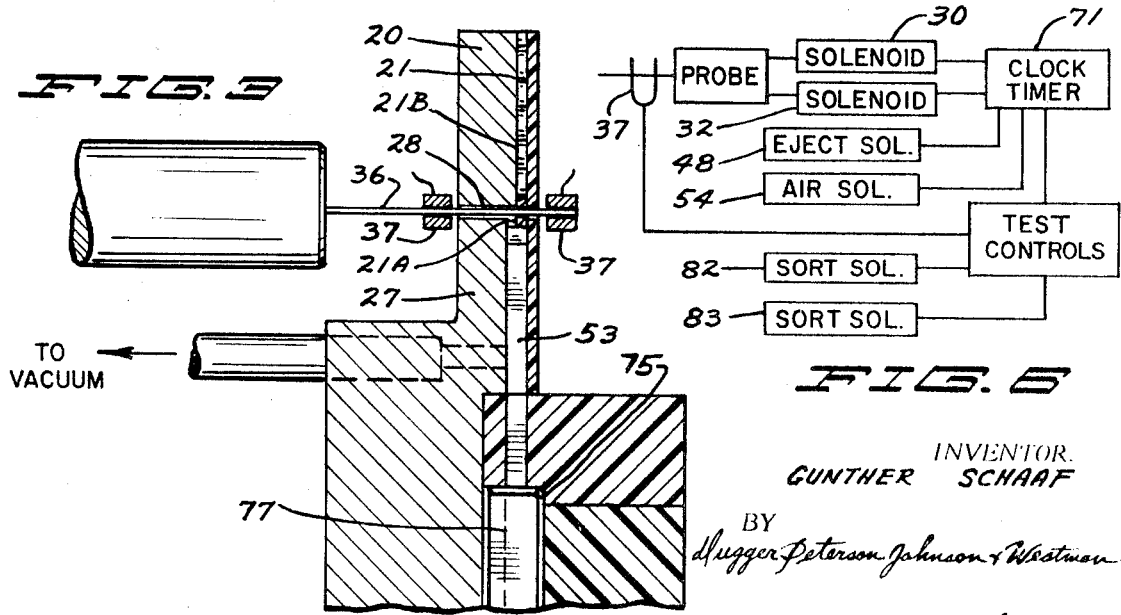

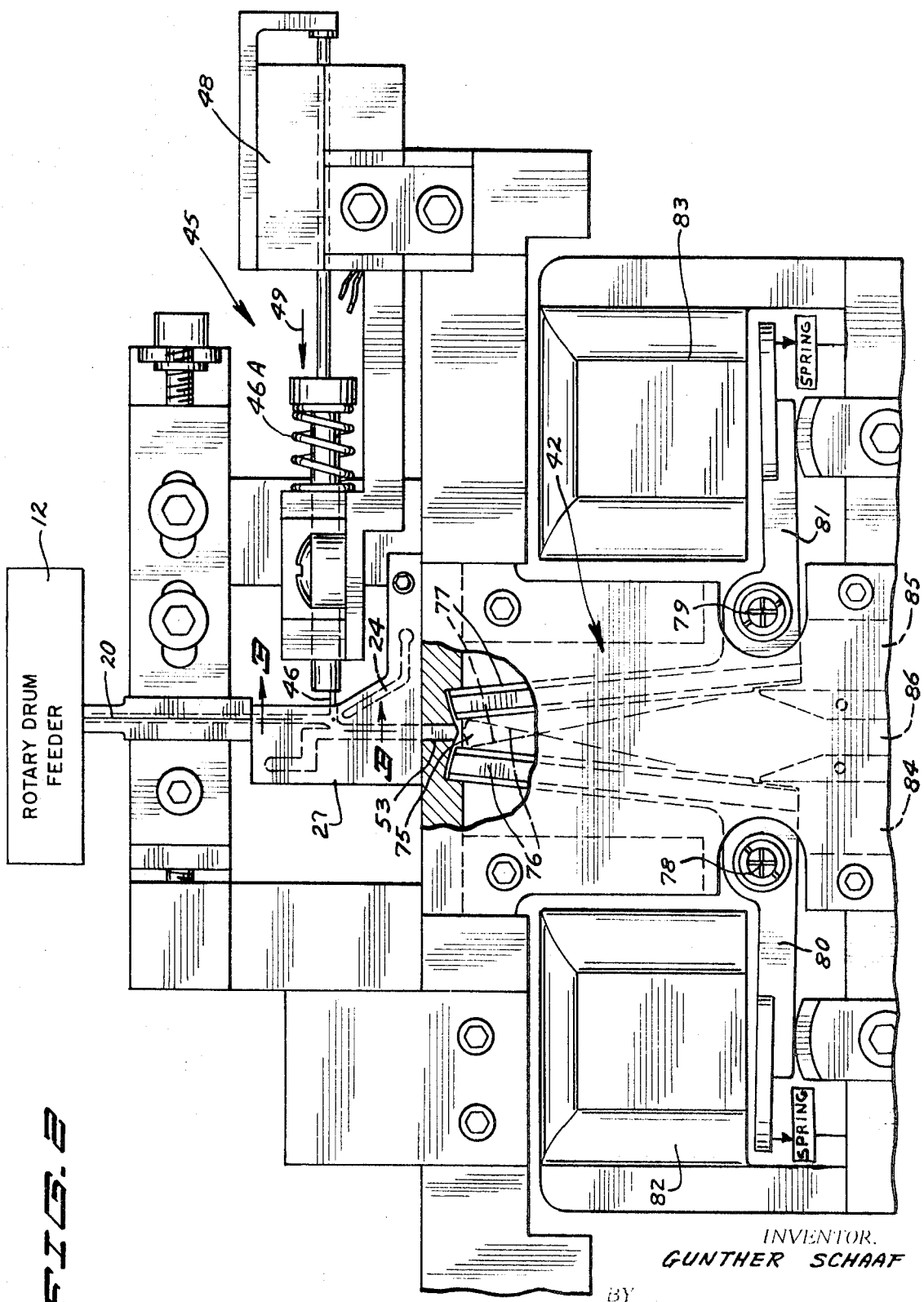

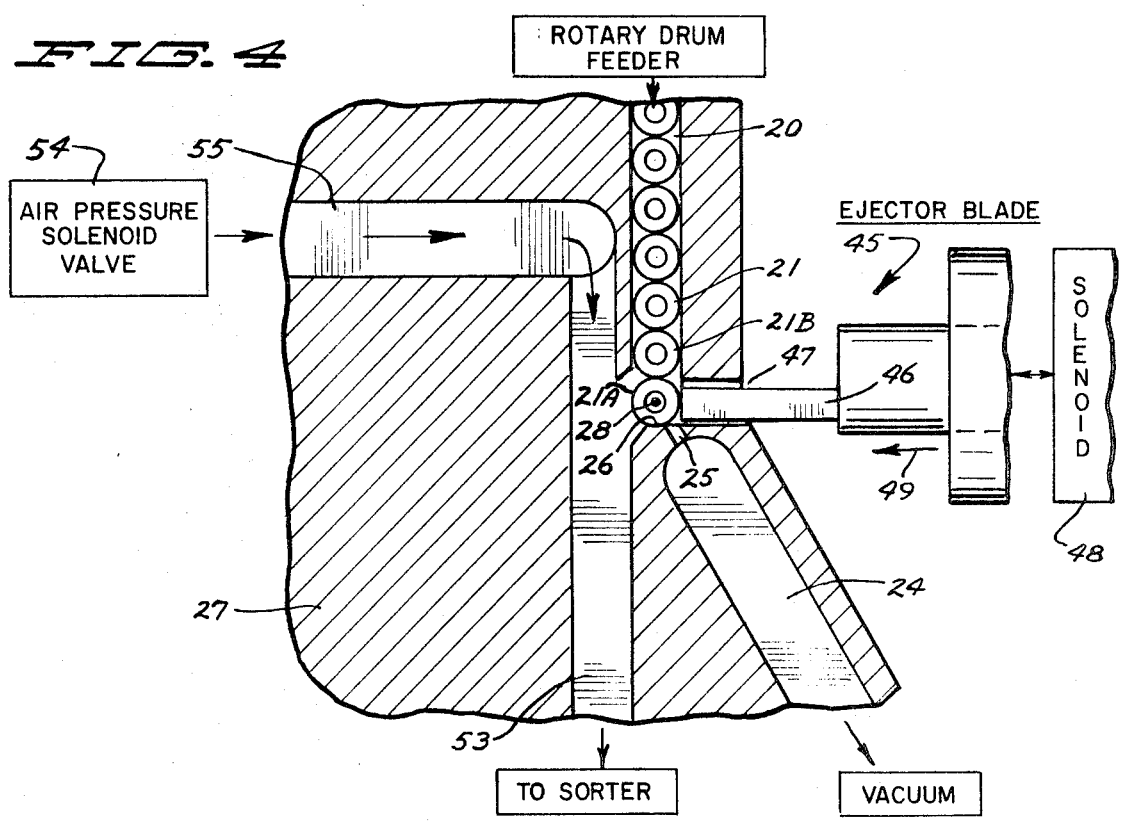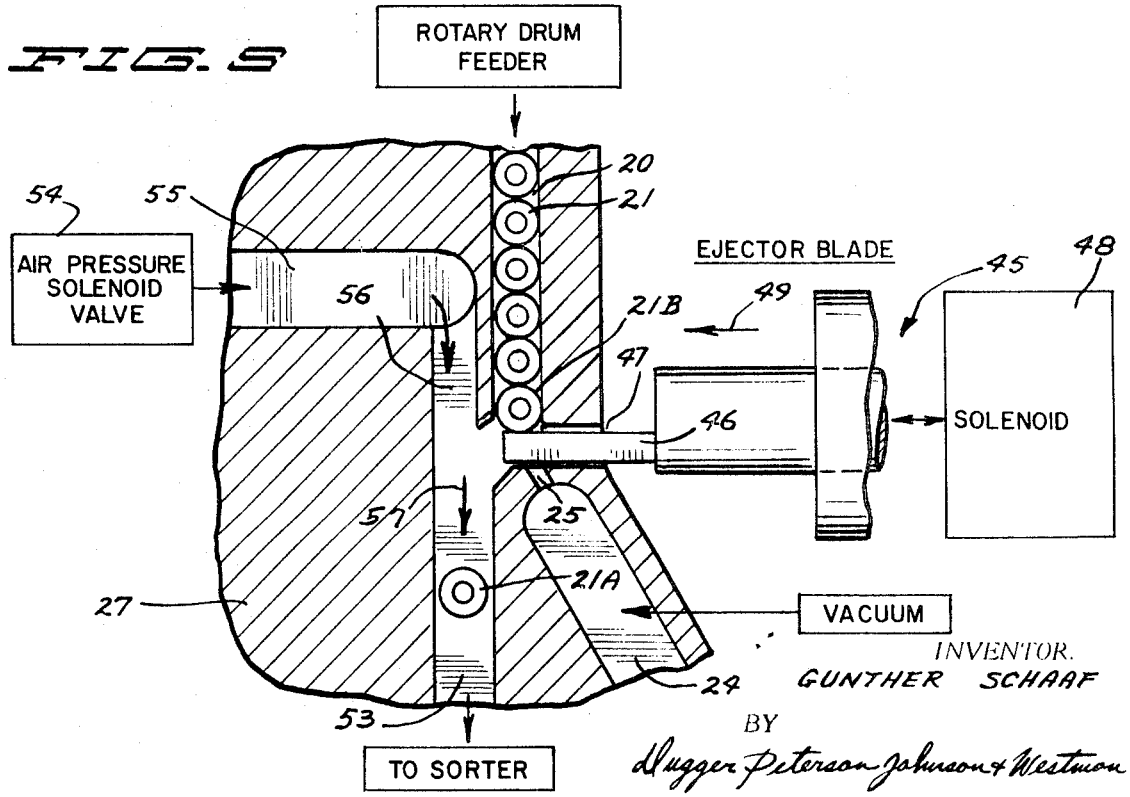

ARTICLE TESTING DEVICE

BACKGROUND OF THE INVENTION

1. Field of the Invention

The present invention has relation to testing objects, in particular magnetic cores, for certain desired characteristics at a test station or site.

2. Prior Art

In the handling of objects, in particular toroidal magnetic cores which are electrically tested for certain properties, the present practice is to support each of the cores during the test cycle on the testing probe. This means that the probe itself must be inserted through the opening in the core and the weight of the cores rests on the probe. When the probe is retracted after test, to permit a tested core to be released, the probe will rub against the interior surface of the opening of the core and can cause chipping, wear on the probe, and can also cause ferrite dust, in particular, to collect on the probe and cause wear on the electrical contacts with which the probe is used.

The magnetic cores being tested are extremely small, generally, and with extremely thin walls. The cores range in outside diameter from 0.012 to 0.020 inches with inside diameters between 0.007 to 0.008 inches. The testing devices in the prior art include for example the U.S. patent to Vosika, U.S. Pat. No. 3,415,368. In this patent, the test device is constructed so that the weight of the cores will rest on the test probe during the test cycle. This does cause probe wear so that the probes have to be replaced from time to time, and can also cause sections of the interior of the core to be chipped loose or worn slightly. In usage, the interior sections of the core surrounding the opening of the cores are critical and any damage to this portion of the core can cause malfunction of the units in which the cores are used.

The patent to Szmereta et al., U.S. Pat. No. 3,382,973 also shows a selection apparatus utilizable for magnetic cores and having a test probe which supports the weight of the core during the test cycle.

SUMMARY OF THE INVENTION

The present invention relates to a testing apparatus having a test site which independently supports the object being tested during the test, so that when the test is made, the testing unit does not support the weight of the object. In particular, where a probe is used for testing magnetic cores, the probe does not support the core during the test. After testing, the object is mechanically and pneumatically ejected from the test site. This minimizes the wear on the testing unit or probe, and for magnetic core testing eliminates the danger of chipping the interior of the core when the probe is inserted or retracted.

Vacuum is used to positively position the object to be tested against a ledge or shoulder at the test site or position. After the test the object is mechanically moved from the test position and further, pneumatic means are used for conveying the object positively to a sorting apparatus. The sorting apparatus can be of any desired configuration and will respond to the signal given by the test device as to whether the object is accepted or rejected.

Where probes are used, the probe arm is mounted to prevent chattering or vibrations when it is solenoid actuated, and the complete operation of the device is through electrically actuated solenoids.

BRIEF DESCRIPTION OF THE DRAWINGS

FIG. 1 is a side elevational view of a testing device made according to the present invention;

FIG. 2 is a fragmentary enlarged front elevational view of the test site of the testing device of FIG. 1 and taken as on line 2-2 in FIG. 1;

FIG. 3 is a further enlarged sectional view taken as on line 3-3 in FIG. 2;

FIG. 4 is a greatly enlarged sectional view of the test site showing a test article in place in the test site in a testing position;

FIG. 5 is a view substantially the same as FIG. 4, but shown where the tested article is being ejected; and FIG. 6 is a schematic representation of controls used with the device of FIG. 1.

DESCRIPTION OF THE PREFERRED EMBODIMENT

The test apparatus shown generally at 10 includes a base 11, and a magnetic core feeding device illustrated generally at 12 which is a rotating drum-type feeder driven by an electric motor 13 having a gear reducing head with an open ended drum 14 mounted on the shaft. The upwardly facing end of the drum is open for loading, and as shown the axis 15 of rotation of the drum is inclined. The drum 14 is loaded with cores, only partially filled of course, and is rotated about its axis 15. There is a feed screw member that feeds the cores upwardly to the outer portion of the drum. Inwardly extending vanes or members inside the inner edge of the drum and extending inwardly from the wall of the drum will cause the cores at the bottom of the drum to be carried upwardly around the periphery of the drum as the drum is rotated about its axis 15, and cores will then drop off into a feed trough or chute 18. The feed trough includes a core orienter section 19. The trough and orienter may be vibrated in a known manner so that the cores go down along the feed trough 18 and enter into an orienting section 19. The orienting section has guides to properly orient a core axis to enter a core test site feed chute 20. The core passes into the core feed chute 20 under gravity. The feed chute is vertically oriented and is just of a size so that a core, generally indicated at 21, will fit within the chute and slide downwardly with the core hole axis properly oriented. The cores drop to the core test station or site indicated generally at 22.

In operation of the machine, vacuum is applied through a channel 24 from a source of vacuum (see FIG. 4) and a small passageway 25 leads into the core feed chute 20 so that the cores 21 are pulled downwardly by the vacuum against an abutment or shoulder 26 which is positioned in direct alignment with the feed chute 20 so that the bottom core designated 21A in FIG. 4 will rest on this shoulder. The vacuum holds the bottom core 21A in place and prevents it from bouncing upwardly when it strikes the shoulder 26.

The test station block 27 has a transverse opening 28 which is positioned to align with the opening in the core 21A, which is in the test station. When the machine is powered and operating, a first solenoid 30 is normally engaged to hold a probe control arm 31 in a retracted position as shown in solid lines in FIG. 1. The operational controls are from a timer, and when the proper time has elapsed, the timer will release or relax solenoid 30 and will energize a second solenoid 32 to pull an actuating lever section 33 of the probe arm upwardly so that the probe arm moves about its axis 34 and the probe arm moves in direction as indicated by the arrow 35 in FIG. 1. The probe, a small slender electrically conductive member 36, then is pushed through the opening 28 and it passes through the opening of the core 21A in the test station, as well. The probe is made so that it will enter contacts 37 on opposite sides of the core 21A in the test station to complete an electrical connection through the probe for testing the core 21A in a usual manner.

The test controls then actuate the test cycle so the test of the core takes place at this time through proper timing arrangements. The core is tested in a usual manner. After the test is completed, the test apparatus gives an accept or a reject signal (the reject signal is usually the absence of a signal) which will determine the positioning of the core sorter illustrated generally at 42. The core sorter can be of any desired design which will direct the tested core (after it has been ejected from the test station) into an accept receptacle or a reject receptacle depending on whether the core is accepted or rejected.

After the core test has been completed, the solenoid 32 will be deenergized by the timer controls and solenoid 30 will be energized to again pull the lever 33 down and move the probe arm 31 rearwardly to its solid line position and withdraw the probe from the contacts and from the test station or site completely. The probe will completely withdraw from the core.

The next step in the test cycle is to actuate the ejector mechanism for the core in the test station. The ejector mechanism 45 comprises a blade member 46 which is of size to slidably fit in a provided opening 47 laterally adjacent the core 21A in the test station (the core resting on the shoulder or abutment 26). The blade 46 is slidably mounted for movement on the frame and has lateral width as great as that of the core channel 20. The blade 46 is connected in a suitable manner to an actuating solenoid 48 that is normally urged by a spring 46A to a retracted position. When the solenoid is energized, the blade 46 is moved in direction as indicated by the arrow 49 so that it will slide through opening 47 over the passageway 25 to shut off the vacuum to the core test station. The blade also will engage the outer edges or periphery of the core 21A and move the core in direction as indicated by arrow 49 so that the core is moved over a removal passageway 53. The core 21B is supported on the blade, and when the blade is retracted, core 21B then drops against the shoulder or abutment. At the same time that the solenoid 48 is energized, an air control solenoid valve 54 is also energized and this directs air under pressure into a passageway 55 in the test block 27. The passageway 55 has a downwardly extending passageway 56 that is aligned with the removal passageway 53. Thus, when the blade 46 moves the tested core 21A over the passageway, this core is forced downwardly as indicated by the arrow 57 by a blast of air to the sorting apparatus 42. The sorting apparatus will previously be set in accordance with the signal from the test of core 21A so that the core will fall into the proper receptacle. The solenoid 48 is deenergized, and the spring load on the blade 46 causes the blade to retract letting core 21B drop into test position.

The solenoid actuated probe arm 31 is prevented from bouncing or chattering when it is actuated by the solenoids 30 or 32 by the use of vibration dampening devices. The rear one of the dampening devices comprises a strip of flexible rubber belting or the like 65 (an elastomeric member) fastened to the tester frame in a suitable manner, and extending upwardly so that the upper end is unsupported and can move back and forth in directions as indicated by the arrow 66. The rear damper is perhaps best seen in FIG. 1. A small metal rivet 67 is placed in the upper end of member 65 to provide for a metal abutment against which the probe arm will strike when it is actuated by the solenoid 30. The probe arm strikes the rivet just before the arm moves to full retracted position. The impact of the arm 31 is transferred immediately then to the flexible member 65 and is dampened by this flexible elastomeric member. The metal rivet 67 provides for transfer of the impact force to the elastomeric member 65. A flexible elastomeric member 68 is supported on a pair of arms 69 which extend forwardly form the frame. The upper end of the member 68 is also free to flex back and forth about its mounting and includes a metal abutment member or rivet against which the forward surface of the probe arm 31 strikes when the solenoid 32 is energized, just before the probe is in its full working position, to absorb impacts and prevent the probe arm 31 from chattering when it is actuated for test.

The controls of the unit are all controlled by a cycling clock timer type control and the complete cycle of operation takes approximately 50 milliseconds. When the machine is powered, the solenoid 30 is normally energized so that the probe is retracted. Then, during the repeating timed cycle, cores are being provided by the feeder mechanism which is running, and a core will come down against the shoulder 26 while the probe is retracted. The controls are illustrated schematically in FIG. 5. The timer 71 then releases the probe retract solenoid 30 and energizes the probe test position solenoid 32 so that the probe arm 31 is moved forwardly and the probe extends through the contacts 37. Then, the test controls are activated and the test result information is passed into the test controls. The correct sort signal, depending on the test results, then goes to the proper sorting apparatus solenoid so that the sorting apparatus will be set either for an accept 01, accept 02 or reject signal (no signal). The eject solenoid 48 is then actuated so that the ejector blade will pass over the vacuum passageway and at the same time the air pressure solenoid 54 is energized for removal of the core from the test station area.

Then, both solenoids 48 and 54 are deenergized, and the testing cycle is repeated. The sorting signals will be held until after the tested core has passed into the proper storage receptacle, and then the sort signal will be relaxed and a new sort signal will be supplied by the test apparatus after the probe is again inserted into a new core to be tested. The timer is high speed and energizes the solenoids and test controls in proper sequence.

The sorting apparatus can be of any desired type. In FIG. 2, a view of a high speed sorter is shown. The sorter is controlled by signals from the test control means. The eject passageway 53 terminates at a larger chamber 75. The chamber houses two core passage chutes or vanes 76 and 77, respectively. These chutes are pivotally mounted as at 78 and 79, respectively, to the frame. A control arm 80 is fixed to chute 76 and controls movement of chute 76 about its pivot. A control arm 81 is attached to chute 77 and controls movement of chute 77 about its pivot.

A solenoid 82 operates arm 80, and a solenoid 83 operates arm 81. The solenoids, when relaxed are spring loaded so the chutes remain in normal position clearing the passageway 53 as shown in FIG. 2.

If the core being tested is rejected by the test apparatus, no signal is given and both solenoids 82 and 83 stay relaxed. The chutes 76 and 77 stay in clearing relationship to passageway 53. The rejected core then drops down between the chutes into a passageway 86 to a reject compartment or receptacle. This also insures that if no signal is given for any reason the cores go to the reject compartment.

If the test controls give a "Core Accept" signal, solenoid 82 is energized by the test apparatus and the arm 80 is pulled up by the solenoid 82. Chute 76 pivots and moves under and aligns with the passageway 53. Then when the accepted core is ejected from the test site it drops through passageway 53 and enters the opening of chute 76 and is directed into a passageway 84 leading to an "accept" receptacle. If a second test signal, for example a conditionally acceptable or second level acceptable signal is given by the test apparatus, this signal will energize solenoid 83 and move chute 77 under passageway 53 to direct the tested core through this chute to a passageway 85 leading to a second level accept storage compartment.

The storage compartments are shown in side view in FIG. 1, and comprise three drawerlike separated compartments.

The chutes are "U" shaped having side legs and a rear wall. The chutes' open side is toward the viewer in FIG. 2 and this can be seen where the cover member for chamber 75 has been broken away.

This type of solenoid actuated sorter which has chutes that are pivotally mounted and move only a short distance to intercept tested articles coming from a passageway and provide a guide for the particle to its proper storage receptacle can be operated to extremely high speeds. The solenoids act instantly to shift the lightweight chutes or vanes to their working position. The solenoids are extremely high speed and fast acting to achieve high speed sorting in the neighborhood of 1200 cores a minute.

The spring load or bias on the chutes can be from torsion bushings at the chute or vane pivots if desired. The arms 80 and 81 abut against adjustable stop means shown in FIG. 2 when the respective solenoids are relaxed. An additional help to obtain high speed with this type of sorter is the ability to select a lever ratio between the arms 80 or 81 and the respective chutes 76 and 77. The distance of actuation by the respective solenoids to obtain the necessary movement at the upper end of the chutes to move under passageway 53 can be selected to optimum operation of the device.

The testing device thus is for extremely high speeds and can operate to test and sort small magnetic cores at high rates of speed without wearing probes excessively and without chipping the interior of the cores.

What I claim is:

1. A device for testing torroidal magnetic cores presented one at a time to a testing station and independently supporting the cores for test apart from the test means, comprising feed means for the articles to present the cores at a testing station sequentially from a column comprising a plurality of cores above the test station, a fixed abutment surface means in the normal path of travel of the cores from the feed means to support the column of cores and each of the cores sequentially one at a time in testing position, means to test each article supported in testing position on the abutment, and a mechanical blade mounted for reciprocating movement laterally of the column of cores, and being of slightly smaller vertical height than the diameter of the cores to move a tested core laterally and support the column when in a first position and to be withdrawn from the path of the cores to permit the column to drop down and the next core in said column to drop onto said abutment when said blade is in a second position.

2. The combination as specified in claim 1, a first passageway opening adjacent said testing position, and vacuum means supplying vacuum to said first passageway to urge said articles coming from said feed means against said abutment, said blade overlying said opening when it moves to its first position.

3. The combination as specified in claim 2, power means to actuate said blade member, and a second passageway laterally offset with respect to a horizontal direction from said test station, said blade moving said cores laterally into said passageway, and a supply of air under pressure, valve means to direct said air under pressure into said second passageway only when said power means for said blade is actuated to move a core laterally from said abutment.

4. A device for testing magnetic cores presented one at a time to a test station comprising a frame, a test station means, feed means for feeding cores to said test station means including a gravity feed section delivering the cores to the test station, an abutment of the frame in position to be engaged by said cores during gravity feed and to retain said cores in proper position for testing, a first passageway below said test station opening adjacent said abutment, a source of vacuum connected to said passageway, probe means, means to actuate said probe means to pass through an opening in a core positioned on said abutment to test said core thereon, means to withdraw said probe after said test has been completed, and means to move said cores in lateral direction off said abutment comprising a solid member of size to substantially cover the passageway connected to the source of vacuum as said solid member moves a tested core laterally off said abutment.

5. The combination as specified in claim 4 and solenoid means to move said solid member laterally to the general path of travel of cores moving to said test station from said feed means, and bias means urging said solid member to a retracted position.

6. The combination as specified in claim 5 and a second removal passageway laterally offset with respect to a horizontal direction from said test station, said solid member moving a tested core laterally off said abutment into said removal passageway, and air pressure means in said removal passageway operative only when said solenoid means is energized to operate said solid member to move a core laterally from said abutment.

7. The combination as specified in claim 4, wherein said abutment comprises a shoulder member positioned in the free fall path of said cores coming from said feed means.

8. A device for testing magnetic cores presented one at a time to a test station comprising a frame, feed means on the frame for feeding said cores to a test station, means to position one test core at a time in said test station and hold it in proper position for testing, probe means movably mounted on the frame, solenoid means to actuate said probe means to a first position to pass through said test core with said test core in surrounding relationship to said probe means, solenoid means to withdraw said probe to a second position after said test has been completed, and means to absorb and dampen shock loads on said probe caused by said solenoid means comprising at least one elastomeric member mounted on said frame and having an unsupported end portion, said end portion being aligned with the path of travel of said probe, and a metal member fixed to said end portion, said elastomeric member being positioned so that the metal member is engaged by said probe just prior to the time said probe reaches one of its positions.

9. A sorting device for sorting tested articles comprising a frame, a test device for testing articles, means to deliver a test result signal from said test device, means on the frame defining an upright passageway, said tested articles falling through said passageway after testing, a chute member, means to pivotally mount said chute member to said frame adjacent the lower end thereof for movement of the upper end to a first position with the upper end of said chute in alignment with said passageway from a second normal position with the first end clearing the normal path of falling movement of articles coming through said passageway, a second end portion of said chute opposite from said first end portion being directed to a desired location, bias means urging said chute member to its second position and power means to move said chute member to its first position in response to a test signal.

10. The sorting device of claim 9, wherein said chute includes lever means fixed thereto and extending outwardly from said pivot, and wherein said means to move said chute comprises solenoid means acting on said lever means.

11. The sorting device of claim 9 and a chamber defined in said frame and opening to said passageway, said chute being positioned in said chamber and having an end adjacent said passageway and offset laterally from said passageway when said chute is in its second position.

PO-1050
(5/69)

UNITED STATES PATENT OFFICE
CERTIFICATE OF CORRECTION

Patent No. 3,589,512        Dated June 29, 1971

Inventor(s) Gunther Schaaf

It is certified that error appears in the above-identified patent and that said Letters Patent are hereby corrected as shown below:

Column 2, line 32 "feed chute" should be--feed chute 20--. Column 4, line 6 "01" should be--#1--; Column 4, line 7 "02" should be--#2--. Column 6 Claim 9, line 14 insert comma (,) after--position--. On the front page of the patent the Inventor's name is spelled "Gunteher" should be--Gunther--.

Signed and sealed this 18th day of January 1972.

(SEAL)
Attest:

EDWARD M. FLETCHER, JR.      ROBERT GOTTSCHALK
Attesting Officer               Acting Commissioner of Patents